United States Patent
Wang et al.

(10) Patent No.: US 9,881,217 B2
(45) Date of Patent: Jan. 30, 2018

(54) METHOD FOR DETECTING CROWD DENSITY, AND METHOD AND APPARATUS FOR DETECTING INTEREST DEGREE OF CROWD IN TARGET POSITION

(71) Applicants: Xin Wang, Beijing (CN); Shengyin Fan, Beijing (CN); Gang Qiao, Beijing (CN); Qian Wang, Beijing (CN)

(72) Inventors: Xin Wang, Beijing (CN); Shengyin Fan, Beijing (CN); Gang Qiao, Beijing (CN); Qian Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 260 days.

(21) Appl. No.: 14/935,627

(22) Filed: Nov. 9, 2015

(65) Prior Publication Data

US 2016/0133025 A1    May 12, 2016

(30) Foreign Application Priority Data

Nov. 12, 2014   (CN) .......................... 2014 1 0645077

(51) Int. Cl.
*H04N 7/18*  (2006.01)
*G06K 9/00*  (2006.01)
*G06K 9/46*  (2006.01)

(52) U.S. Cl.
CPC ..... *G06K 9/00778* (2013.01); *G06K 9/00369* (2013.01); *G06K 2009/4666* (2013.01)

(58) Field of Classification Search
CPC .................. G06K 9/00624; G06K 9/00362
USPC ............................................. 348/135
See application file for complete search history.

(56) References Cited

U.S. PATENT DOCUMENTS

| 8,812,344 B1 * | 8/2014 | Saurabh | G06Q 30/0201 |
| | | | 705/7.29 |
| 2012/0263346 A1 * | 10/2012 | Datta | G06K 9/4604 |
| | | | 382/103 |

\* cited by examiner

*Primary Examiner* — Richard Torrente
(74) *Attorney, Agent, or Firm* — Harness, Dickey & Pierce, P.L.C.

(57) ABSTRACT

A method and an apparatus for detecting an interest degree of a crowd in a target position are disclosed. The interest degree detection method includes projecting a depth image obtained by photographing onto a height-top-view, the depth image including the crowd and the target position; dividing the height-top-view into cells; determining density of the crowd in each cell; determining a moving speed and a moving direction of the crowd in each cell; determining orientation of the crowd in each cell; and determining, based on the density, the moving speed, the moving direction and the orientation of the crowd, the interest degree of the crowd in each cell in the target position. According to this method, the interest degree of the crowd in the target position can be detected accurately, even at a crowded place where it is difficult to detect and track a single person.

12 Claims, 5 Drawing Sheets

RADIUS IS 1    RADIUS IS 2

← TARGET POSITIONS

METHOD FOR DETECTING CROWD DENSITY, AND METHOD AND APPARATUS FOR DETECTING INTEREST DEGREE OF CROWD IN TARGET POSITION

BACKGROUND OF THE INVENTION

1. Field of the Invention

The present invention generally relates to image processing, and particularly, a method and an apparatus for detecting an interest degree of a crowd in a target position, and a method for detecting crowd density.

2. Description of the Related Art

The technology of detecting an interest degree of a crowd in a target position is widely used in many fields such as building internal layout, security monitoring, etc. For example, such technology is usually used in the field of building internal layout to detect an interest degree of a crowd of visitors in an exhibition item at a target position in an exhibition hall, by which an important basis for decision-making can be provided for a decision maker to rationally arrange display counters, perform crowd-control and efficiently utilize the space of the exhibition hall. As another example, such technology is usually used in the field of security monitoring to detect an interest degree of a crowd in a target position of the security monitoring such as a train station or a government building, who gathers around the target position of the security monitoring; so that a basis for decision-making can be provided for a decision maker to determine whether such crowd might disturb public order (for example, hold a demonstration) or endanger public security.

Currently, as a conventional method for detecting an interest degree, crowd density (number of persons in the crowd) is determined by manual count, automatic count based on WIFI or RFID, and detection and tracking in a photographed image; and it is regarded that the interest degree in a target position is relatively high if the crowd density is large, otherwise it is regarded that the interest degree in the target position is relatively low if the crowd density is low. However, human cost of determining the number of persons by manual count is often high, the accuracy of automatically counting the number of persons based on WIFI or RFID is low, and the accuracy of determining the number of persons by detecting and tracking the persons in a photographed image greatly decreases at a crowded place. On the other hand, in these methods, only the crowd density is considered to determine an interest degree of a crowd in a target position, and the impact of other elements on the interest degree is ignored; thus these methods are not objective. For example, the crowd density around an exhibition item on the way which must be passed in an exhibition hall is usually high; however, it cannot be explained that the interest degree of the crowd in this exhibition item is very high, since the reason for that is because this exhibition item is just on the only way for the crowd to pass.

In view of at least one of the above problems, the present invention has an object to provide a method for detecting an interest degree of a crowd in a target position that can objectively, accurately and automatically detect the interest degree of the crowd in the target position, even at a crowded place where it is difficult to track an individual.

SUMMARY OF THE INVENTION

According to an aspect of the present invention, a method for detecting an interest degree of a crowd in a target position includes projecting a depth image obtained by photographing onto a height-top-view, the depth image including the crowd and the target position; dividing the height-top-view into cells with a predetermined size; determining density of the crowd in each of the cells; determining a moving speed and a moving direction of the crowd in each of the cells; determining orientation of the crowd in each of the cells; and determining, based on the density, the moving speed, the moving direction and the orientation of the crowd, the interest degree of the crowd in each of the cells in the target position.

According to another aspect of the present invention, an apparatus for detecting an interest degree of a crowd in a target position includes a projection unit configured to project a depth image obtained by photographing onto a height-top-view, the depth image including the crowd and the target position; a division unit configured to divide the height-top-view into cells with a predetermined size; a density determination unit configured to determine density of the crowd in each of the cells; a motion determination unit configured to determine a moving speed and a moving direction of the crowd in each of the cells; an orientation determination unit configured to determine orientation of the crowd in each of the cells; and an interest degree detection unit configured to determine, based on the density, the moving speed, the moving direction and the orientation of the crowd, the interest degree of the crowd in each of the cells in the target position.

According to another aspect of the present invention, a method for detecting crowd density includes projecting a depth image obtained by photographing onto a height-top-view, the depth image including a crowd; dividing the height-top-view into cells with a predetermined size; for each cell, extracting a density detection feature indicating distribution of differences in height between pixels in the cell; and detecting, based on the density detection feature, using a density model previously constructed by a statistical learning method, number of persons in each of the cells.

According to the technology of detecting the interest degree of the crowd in the target position according to embodiments, the interest degree of the crowd in the target position is comprehensively determined based on the crowd density, the crowd motion and the crowd orientation; thus the detection result is more objective and accurate than that of a method for detecting an interest degree of a crowd in a target position based on only the crowd density. Furthermore, according to the technology of detecting the interest degree of the crowd in the target position according to the present invention, the interest degree is detected by detecting a crowd as a whole, but not by tracking and detecting each individual; thus, a good detection result can be obtained, even at a crowded place where it is difficult to track an individual. Additionally, in the technology of detecting the interest degree of the crowd in the target position, a density detection feature based on a height is used to detect the crowd density; thus, a human body can be detected accurately and the accuracy of the crowd density detection can be improved, since a human body proportion is considered in the density detection feature based on the height and accordingly this feature can represent a human body well.

DETAILED DESCRIPTION OF THE PREFERRED EMBODIMENTS

In the following, embodiments of the present invention are described in detail with reference to the accompanying drawings, so as to facilitate the understanding of the present invention.

First, technical terms mentioned in the description will be introduced briefly.

It is well known that the grayscale image is a monochromatic image with a plurality of grayscale color ranges or a plurality of grayscale levels from black to white. Each pixel in the image is usually represented by 8-bit data, accordingly the image may have 256 kinds of grayscale levels. In the color image, each pixel is usually represented by three components, e.g., red (R), green (G) and blue (B), and the component is within 0 to 255. However, the forming method and the main function of the grayscale image and the color image are similar (both of them are used to represent color information). Thus, even though a grayscale image is used in the following description of embodiments, the grayscale image may be replaced by a color image.

The depth image is an image in which a value of each pixel represents a distance between a point in a scene and a camera. In comparison with the grayscale image (or the color image), the depth image has depth (distance) information, thus the depth image is suitable for various applications requiring three-dimensional information.

The top view, which is also referred to as the "plan view", is a view obtained by performing orthographic projection for an object from top to bottom. The top view includes the area-top-view, the height-top-view and the like. In the present invention, a top view means a height-top-view, where a height value of a highest point in space serves as a pixel value of a corresponding position in a top view, unless there is a specific description.

Figure 1:
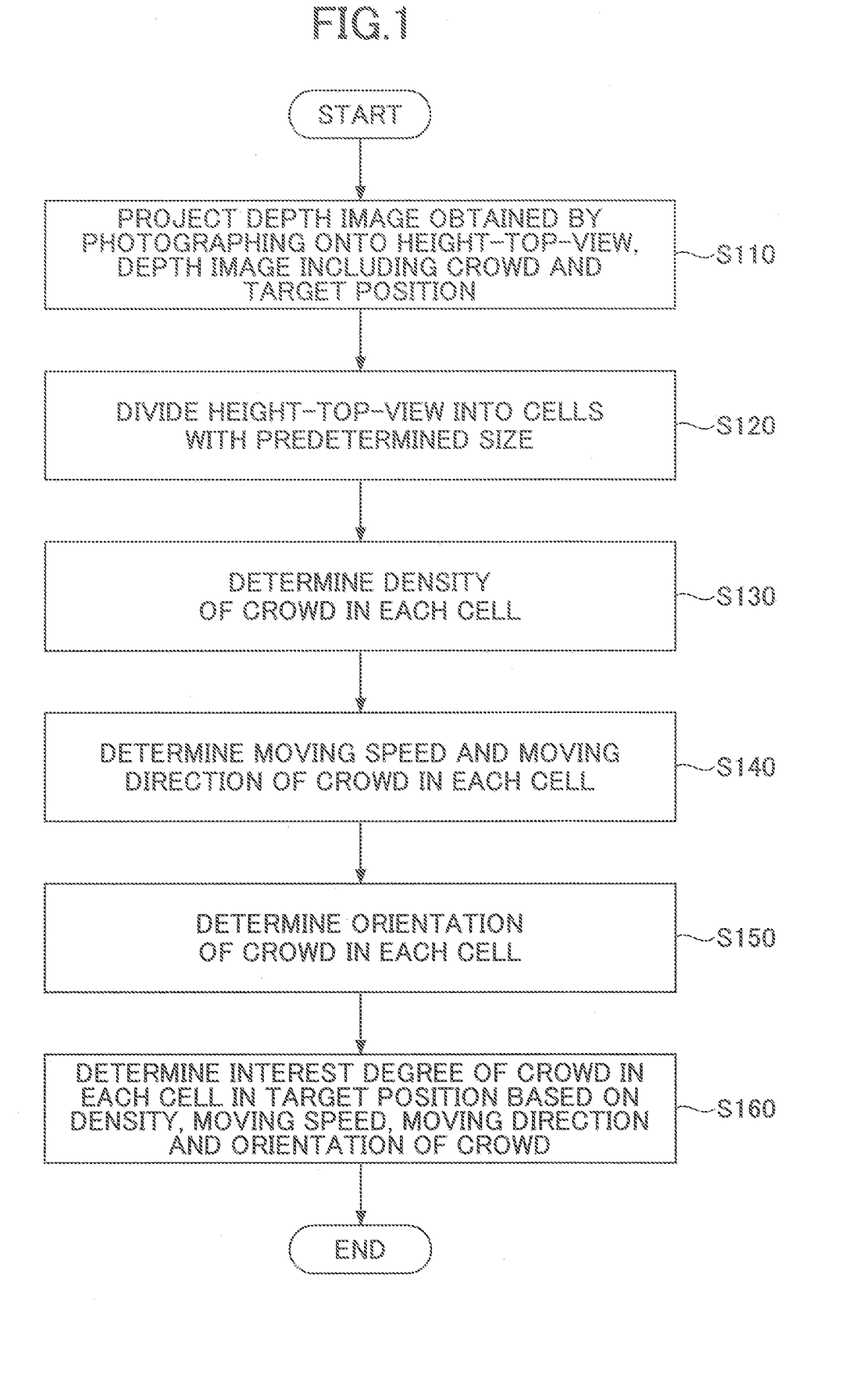
FIG. 1 is a flowchart illustrating a method for detecting an interest degree of a crowd in a target position according to an embodiment.

In the following, a method for detecting an interest degree of a crowd in a target position according to an embodiment will be described with reference to FIG. 1. FIG. 1 is a flowchart illustrating a method for detecting an interest degree of a crowd in a target position according to an embodiment.

As shown in FIG. 1, in step S110, a depth image obtained by photographing, which includes the crowd and the target position, is projected onto a height-top-view.

The projection processing may be implemented by any known methods in the art. As a conventional method, coordinates of the pixels in an image coordinate system in the photographed depth image are transformed into coordinates in a world coordinate system by coordinate transformation, and then pixels in the world coordinate system obtained by the transformation are mapped into the height-top-view.

The transformation process of transforming the coordinates of the pixels in the image coordinate system into the coordinates in the world coordinate system is known in the art, and the description is omitted here. A conventional method for mapping the pixels in the world coordinate system into the height-top-view is represented as the expression (1).

$$\text{top}U = \lfloor (X_W - X\text{min})/\delta_{ground} \rfloor$$

$$\text{top}V = \lfloor (Z_W - Y\text{min})/\delta_{ground} \rfloor \quad (1)$$

Where $X_W$ and $Z_W$ represent coordinates of the projection point on the ground corresponding to the pixels $(X_w, Y_w, Z_w)$ in the world coordinate system, (topU,topV) are coordinates of the pixel in the height-top-view $\delta_{ground}$ is a real length represented by the pixel in the defined height-top-view, $X_{min}$ and $Y_{min}$ are constants predefined based on a shooting range of a camera, and the specific values thereof may be determined based on experiments or experience as long as topU and topV are positive.

A more specific description of a conventional method for performing the projection processing may refer to the article published in 2003, for which the author is Michael Harville and the title is "Stereo Person Tracking with Adaptive Plan-View Templates of Height and Occupancy Statistics", the entire contents of which are hereby incorporated by reference.

Furthermore, optionally, in this step, a foreground region may be separated from the image by a method of background modeling and only the foreground region is projected onto the height-top-view, rather than directly projecting the entire depth image obtained by photographing, which includes the crowd and the target position, onto the height-top-view. The foreground region is an effective region around the target position. Interference pixels are removed by foreground division, thus the noise in the height-top-view can be reduced by projecting the foreground region onto the height-top-view.

In step S120, the height-top-view is divided into cells with a predetermined size.

In the present embodiment, the crowd is detected as a whole, because it is often difficult to track a single individual at a crowded place. Specifically, the interest degree of the crowd in each cell with respect to the target position is calculated, each cell in the height-top-view serves as a unit and corresponds to a unit region on the ground in the real world. The size of the cell may be previously set based on degree of crowdedness and experience, and for example, the cell may be a square region whose side length is 1 meter or 2 meters. In an extreme case, the entire height-top-view may serve as a cell. It should be noted that, the height-top-view may not be divided into cells with the same size, and may also be divided into cells with different sizes as necessary.

In step S130, density of the crowd in each of the cells is determined. In the following, a specific process of the step will be described with reference to FIG. 2.

Figure 2:
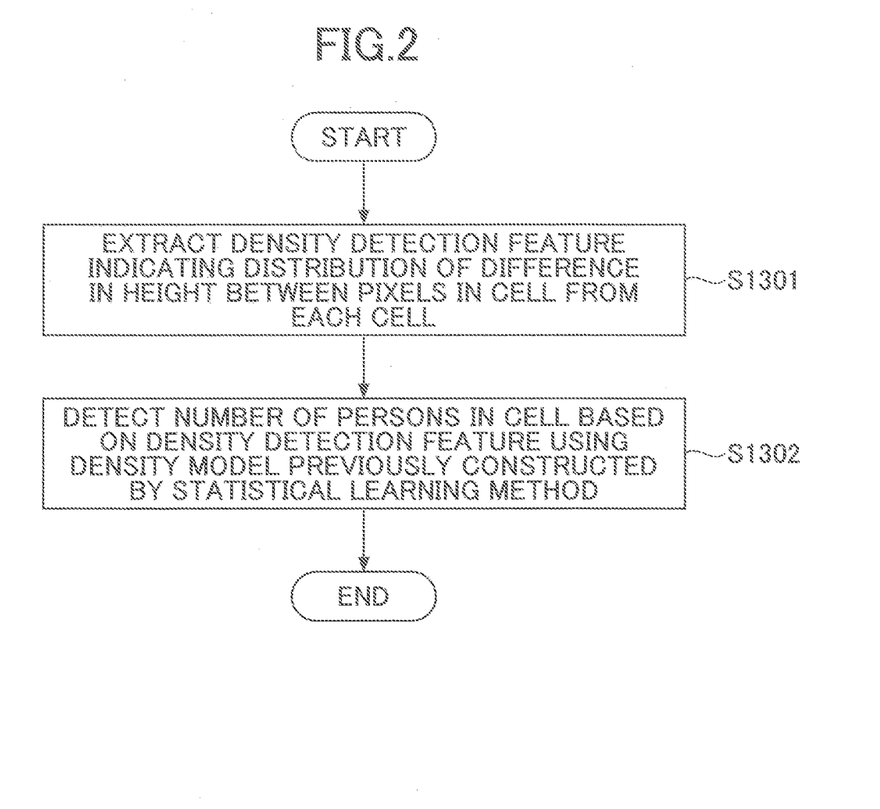
FIG. 2 is a flowchart illustrating a process of determining crowd density in each cell in the method for detecting the interest degree of the crowd in the target position according to the embodiment.

As shown in FIG. 2, in step S1301, a density detection feature, which indicates distribution of differences in height between pixels in the cell, is extracted from each cell.

Here, any appropriate image features such as a local binary pattern (LBP) feature, a gradient feature, a Harris feature, a Haar feature and the like may be used as the density detection feature, as long as the feature can represent distribution of differences in height between pixels in the cell. In the following, an example of using a LBP feature as a density detection feature will be described.

The LBP feature is a feature which is usually used to describe a local texture of an image. The meaning of a basic LBP feature is as follows. In a 3×3 window, grayscale values of 8 adjacent pixels are compared with that of a center pixel of the window serving as a threshold; if the grayscale value of the adjacent pixel is greater than that of the center pixel, then 1 is allocated to a value of the adjacent pixel, otherwise 0 is allocated to the value of the adjacent pixel. Then, an 8-bit binary code composed of the sequentially arranged 0s or 1s, which is allocated to the values of the 8 pixels in the 3×3 window, is set as an LBP value of the center pixel in the window, and the LBP value is used to reflect texture information of the region.

Figure 3:
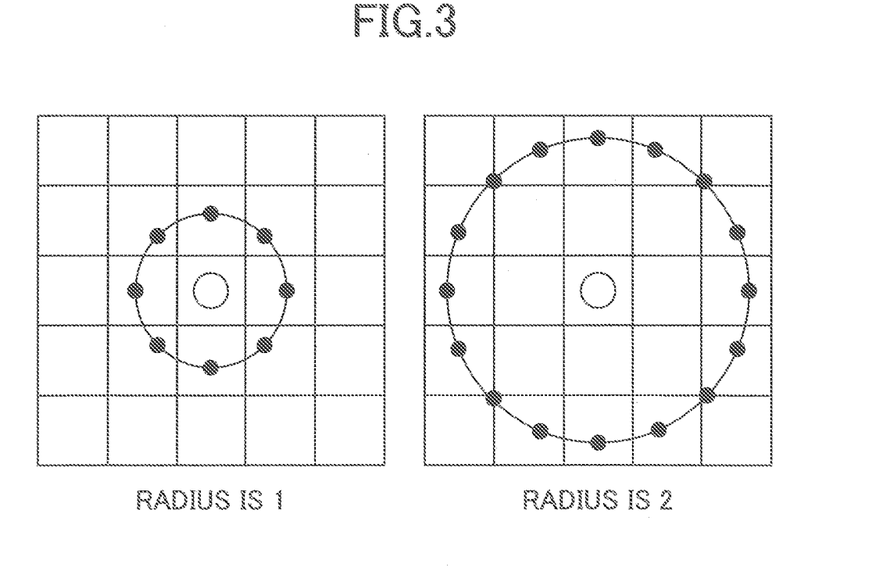
FIG. 3 is a schematic drawing illustrating examples of circular LBP features with different radiuses R.

A basic LBP operator has a unique defect, namely, a basic LBP operator just covers a small region within a fixed range; thus the request for different sizes and frequency textures cannot be satisfied. In order to accommodate different texture features, the LBP feature is improved, so that the 3×3 window is extended to any windows and the rectangular window is replaced by a circular window, and thereby a circular LBP feature is obtained. It is allowed by the circular LBP feature that there are any pixels in a circular adjacent region whose center is a center pixel and radius is R. For example, FIG. 3 illustrates examples of circular LBP features with different radiuses R. In the present embodiment, the LBP feature means a circular LBP feature, unless there is a specific description.

When a LBP feature is used as an example of the density detection feature, in step S1301, the LBP feature is extracted in the cell, and this processing is known by a person in the art. Here, for only convenience of explanation, the processing is briefly described as follows. Specifically, in step S1301, for each pixel in the cell, the following processing is performed. (S1) Adjacent pixels J around the pixel P as a center, whose distance from the pixel P is a predetermined distance are determined; (S2) a pixel value of the pixel P and a pixel value of each adjacent pixel J are compared; (S3) if the pixel value of an adjacent pixel J is greater than the pixel value of the pixel P, then 1 is allocated to a value of the adjacent pixel J, otherwise 0 is allocated to the value of the adjacent pixel J; and (S4) a binary code composed of the values of the adjacent pixels J is set as a LBP code of the pixel P. It should be noted that, a conventional LBP feature is extracted from a grayscale image, and reflects a difference of grayscale values between a center pixel and adjacent pixels; on the other hand, the LBP feature in step S1301 is extracted from a height-top-view, and reflects a difference of height values between a center pixel and adjacent pixels.

Thus, correctly speaking, the LBP feature extracted in step S1301 is a LBP feature based on a height.

Considering a human-specific proportion characteristic, optionally, value 1 or 0 may be allocated to the adjacent pixels in the above processing (S3) as shown in expression (2).

$$g(J) = \begin{cases} 1, & h(P) - h(J) < T \ \& \ h(J) > H_{min} \\ 0, & \text{otherwise} \end{cases} \quad (2)$$

Where g(J) is the value allocated to the adjacent pixel J, h(P) and h(J) are respectively the pixel value of the center pixel P and the pixel value of the adjacent pixel J in the height-top-view. T and $H_{min}$ are thresholds previously set based on a head-shoulder model of the human body. Specifically, when looking down at a head-shoulder portion of a person, its appearance has a general rule in which center (a head portion) is high and two sides (shoulder portions) are low, because of a human-specific proportion. Here, T represents a difference in height between a highest point of the head portion and the shoulder portions of a human body, and $H_{min}$ represents a distance from the ground to the highest point of the shoulder portions of the human body. According to the expression (2), in the processing (S3), if a difference between the pixel value h(J) of the adjacent pixel J and the pixel value h(P) of the pixel P is less than a first threshold T and the pixel value h(J) of the adjacent pixel J is greater than a second threshold $H_{min}$, then 1 is allocated to the value of the adjacent pixel J, otherwise 0 is allocated to the value of the adjacent pixel J. The head-shoulder model of the human body is used to extract the LBP feature as shown in the expression (2), thus the human body can be represented better and the crowd density can be accurately detected.

Furthermore, as a basic method of the above processing (S4), the binary code composed of the sequentially arranged values of the adjacent pixels is directly set as the LBP code of the pixel. However, according to this method, the binary code may generate different results after rotation (a cyclic shift). That is to say, if the image rotates, the LBP codes may become different for the same crowd arrangement; thus an adverse impact on the detection result of the crowd density may be caused. Therefore, optionally, rotation-invariant processing for the binary code composed of the sequentially arranged values of the adjacent pixels may be performed, and the binary code after the rotation-invariant processing may be set as the LBP code of the pixel P. The rotation-invariant processing of LBP is known by a person in the art, the processing will be briefly described only for the integrity of description. The rotation-invariant processing may be performed according to the following expression (3).

$$LBP_{P,R} = \min\{ROR(LBP_{P,R}i))|i=0,1,\ldots,P-1\} \quad (3)$$

Here, P is a length of the binary code, namely the number of the adjacent pixels J around the center pixel P, and it is assumed that P=8 in the present embodiment; R is radius of an adjacent region, namely a distance from adjacent pixels J to the center pixel P, and it is assumed that R=2 in the present embodiment; and ROR is a cyclic shift command, such as ROR(11000000,1)=10000001.

By the rotation-invariant processing as shown in the expression (3), the binary codes with the same coding mode are unified as the same coding result, namely a minimum value in rotation results of the coding mode. For example, the binary codes "10011110" and "11110100" have the same coding mode, namely, 5 adjacent pixels in the 8 adjacent pixels J of the center pixel P satisfy a predetermined condition and value 1 is allocated to the 5 adjacent pixels (for example, their pixel values are greater than the pixel value of the center pixel P, or the 5 adjacent pixels and the center pixel P satisfy a head-shoulder model), and other 3 adjacent pixels do not satisfy the predetermined condition and value 0 is allocated to the 3 adjacent pixels; accordingly, both of the results of the binary codes "10011110" and "11110100" after the rotation-invariant processing are "00111101". By the rotation-invariant processing, the binary codes have rotational invariance; thus, the detection result of the crowd density is the same for whatever orientation of persons, namely the detection of the crowd density has robustness.

It should be noted that, when the length of the binary code is 8, there are at most 256 kinds of binary codes; however, after the rotation-invariant processing as shown in the expression (3), there are at most 36 kinds of binary codes, which correspond to the following decimal values.

$\{LBP_{P,R}56 = \{0,1,3,5,7,9,11,13,15,17,19,21,23,25,27,29, 31,37,39,43,45,47,51,53,55,59,61,63,85,87,91,95,111,119, 127,255\}$

Referring to FIG. 2, in step S1302, number of persons in each cell is detected based on the density detection feature, using a density model previously constructed by a statistical learning method.

In this step, for each cell, the number of persons in the cell is calculated. Specifically, the LBP codes of the pixels in the cell are classified, so that the same LBP codes are classified into the same category; and the number of the LBP codes included in each category is determined.

In step S1301, the density detection feature (the LBP feature) is extracted in the cell, and the LBP code is calculated for pixels in the cell. It should be noted that, the binary codes of different pixels in the cell may be the same. Here, classification and statistical processing are performed for the LBP codes of the pixels in the cell, so as to obtain a statistical result of number of categories of the LBP codes in the cell and number of the LBP codes included in each category (namely appearing times of the different LBP codes). As an example of representation method of the statistical result, the category of the LBP codes in the cell and the number of the LBP codes included in each category may be represented by a multi-dimensional array, where each element in the array represents an LBP code and value of the element represents appearing times of the LBP code.

It should be noted that, the LBP codes to be classified may be the binary code composed of the sequentially arranged values of the adjacent pixels, may also be the binary code composed of the sequentially arranged values of the adjacent pixels after the rotation-invariant processing. In the following, as an example of the LBP code to be classified, the binary code obtained after the rotation-invariant processing will be described.

After the classification and statistical processing for the LBP codes of the pixels in the cell, the number of the persons in each cell is calculated using the density model, based on the categories of the classified LBP codes and the number of the LBP codes included in each category.

Figure 4A:
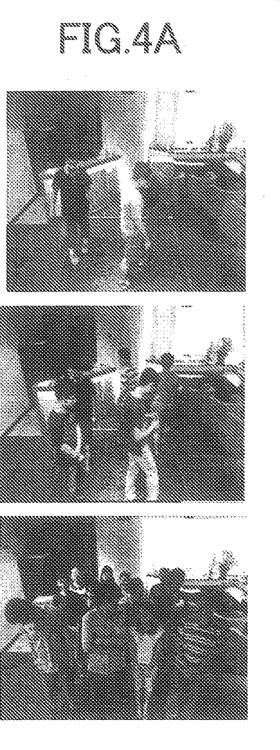
FIG. 4A is a schematic drawing illustrating arrangement scenes of a crowd of three examples.

The density model is obtained by performing training by the statistical learning method, in which the categories of the LBP codes and the number of the LBP codes included in each category serve as independent variables and actual number of persons in cells corresponding to values of the independent variables serves as dependent variables, and the actual number of the persons is obtained by statistical processing in advance. In the following, the density model will be described with reference to FIGS. 4A to 4C. FIG. 4A is a schematic drawing illustrating arrangement scenes of crowds of three examples, FIG. 4B is a schematic drawing illustrating height-top-views corresponding to the arrangement scenes of the crowds shown in FIG. 4A, and FIG. 4C is a schematic drawing illustrating extraction results of a LBP feature from the height-top-views shown in FIG. 4B.

Figure 4B:
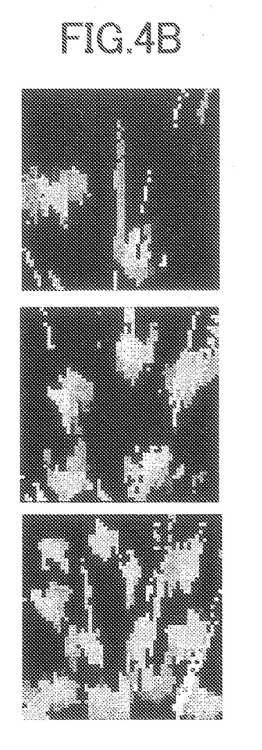
FIG. 4B is a schematic drawing illustrating height-top-views corresponding to the arrangement scenes of the crowd shown in FIG. 4A.
Figure 4C:
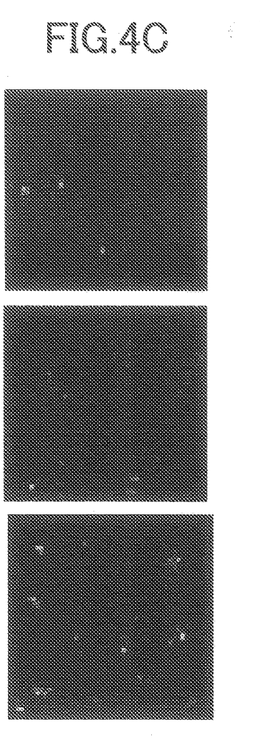
FIG. 4C is a schematic drawing illustrating extraction results of a LBP feature from the height-top-views shown in FIG. 4B.

As shown in FIGS. 4A to 4C, FIG. 4A illustrates the arrangement scenes of the crowds that respectively include 2, 5 and 12 persons, and FIG. 4B illustrates the height-top-views respectively corresponding to the three arrangement scenes of the crowds. For the three height-top-views in FIG. 4B, extraction results of the LBP features shown in FIG. 4C can be obtained by the above steps S120 and S1301 according to the present embodiment (for convenience of explanation, the height-top-view in FIG. 4B is regarded as one cell). For the extraction results of the LBP features as shown in FIG. 4C, classification and statistical processing is performed for the LBP codes of the pixels as described above, so as to obtain a statistical result of number of categories of the LBP codes in the cell and number of the LBP codes included in each category (namely appearing times of the different LBP codes). Accordingly, the categories of the LBP codes and the numbers of the LBP codes included in each category, which respectively correspond to the crowd density of 2 persons, 5 person and 12 persons, can be obtained as training samples. Similarly, for any other crowd density, a statistical result of categories of the LBP codes and number of LBP codes included in each category may be obtained as training samples. After obtaining a certain number of training samples, the density model may be obtained by performing training by the statistical learning method, in which the categories of the LBP codes and the number of the LBP codes included in each category serve as independent variables and the corresponding crowd density (namely the number of persons) serves as dependent variables. The statistical learning method may use any conventional methods such as a linear regression method, an SVM regression method, a two-classification method and the like; and specific description is omitted here since the process of obtaining the density model by performing training using the statistical learning method is well known.

It should be noted that, the density model describes a corresponding relationship between the crowd density, and the categories of the corresponding LBP codes and the number of the LBP codes included in each category. Thus, after performing the classification and statistical processing for the LBP codes of pixels in the cell, the crowd density corresponding to the categories of the LBP codes and the number of the LBP codes included in each category can be obtained by using the density model.

The specific processing method for determining the crowd density in each cell according to the present embodiment has been described above. It should be noted that, the method for determining the crowd density in each cell is not limited to this, and any other appropriate conventional methods in the art may be used to determine the crowd density in each cell. For example, statistical processing of the number of effective pixels (namely, pixels representing a human body, in which noise pixels are removed) may be performed based on the height-top-view, and the number of persons in each cell may be detected using a density model constructed by a statistical learning method in advance, where the density model represents a corresponding relationship between the effective pixels and pre-known actual number of persons. As another example, a region corresponding to the cell may be determined from the photographed depth image including the crowd and the target position, detection of persons may be performed for the depth image by conventional image detection technology, and the detected result may be set as the crowd density in the cell. As another example, a unit region on the ground in the real world, which corresponds to the cell, may be determined; and the number of persons in the region may be automatically counted by WIFI or RFID as the crowd density in the cell.

Referring back to FIG. 1, in step S140, a moving speed and a moving direction of the crowd in each of the cells are determined. In the following, the process will be described with reference to FIG. 5.

Figure 5:
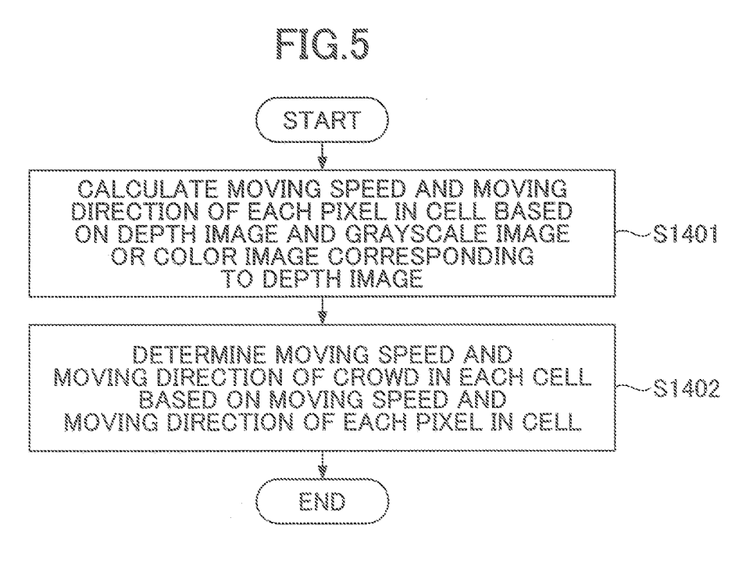
FIG. 5 is a flowchart illustrating a process of determining a moving speed and a moving direction of the crowd in each cell in the method for detecting the interest degree of the crowd in the target position according to the embodiment.

As illustrated in FIG. 5, for each cell, in step S1401, the moving speed and the moving direction of each pixel in the cell are calculated, based on the depth image and a grayscale image or a color image corresponding to the depth image.

In this step, tracking may be performed in the depth image and the grayscale image (the color image) using any conventional image processing technologies such as the optical flow method, so as to obtain motion information of each pixel. For example, it is assumed that, $(x^t, y^t, d^t)$ are image coordinates and depth value of the tracked pixel in a current time, and coordinates of the corresponding pixel in a world coordinate system are $(x_w^t, y_w^t, d_w^t)$; and $(x^{t-1}, y^{t-1}, d^{t-1})$ are image coordinates and depth value of the tracked pixel in a previous time, and coordinates of the corresponding pixel in the world coordinate system are $(x_w^{t-1}, y_w^{t-1}, d_w^{t-1})$. Thus, inter-frame displacements of the pixel in the world coordinate system, namely the moving speed of the pixel may be calculated as shown in expression (4).

$$dx = X_w^t - X_w^{t-1}$$

$$dy = Y_w^t - Y_w^{t-1}$$

$$dz = Z_w^t - Z_w^{t-1} \quad (4)$$

On the other hand, the points in the world coordinate system may be mapped into the height-top-view as shown in expression (1), so as to obtain the moving speed of each pixel in the cell of the height-top-view; accordingly, the moving direction $\theta_i$ of each pixel i may be calculated as shown in expression (5).

$$\theta_i = \arctan \frac{dz_i}{dx_i} \quad (5)$$

Here, $dx_i$ and $dz_i$ respectively correspond to the inter-frame displacements of the pixel on x-axis and z-axis calculated as shown in expression (4).

In step S1402, the moving speed and the moving direction of the crowd in the cell are determined, based on the moving speed and the moving direction of each pixel in the cell.

As described above, in the present embodiment, one cell in the height-top-view is set as a unit, and the interest degree of the crowd in the target position in each cell is calculated. Thus, in this step, the whole moving speed and direction of the crowd in the cell are calculated.

Assuming that there are K pixels in the cell, then an arithmetic average value, a weighted average value or a median value of the moving speeds of the K pixels may be calculated as a whole moving speed of the cell. For example, when an arithmetic average value is calculated as the whole moving speed of the cell, the calculation may be performed as shown in expression (6).

$$\rho = \frac{\sum_{i=1}^{K} \sqrt{dx_i^2 + dz_i^2}}{K} \quad (6)$$

Here, $\rho$ represents the whole moving speed of the cell and i is a pixel number.

On the other hand, a main direction in the moving directions of the K pixels in the cell may serve as the whole moving direction of the cell. For example, 360 degrees may be divided into several sections with a predetermined number of degrees (such as 30 degrees, 40 degrees, 45 degrees or the like); statistics of determining which section the moving directions of the K pixels belong to are taken; a section where the most moving direction of the pixels belong is set as the section of the whole moving direction; and a minimum value, a median value or a maximum value within the section is set as the whole moving direction $\theta$ of the cell.

It should be noted that, the calculation of the whole moving speed and direction of the crowd in the cell as described above is just an example, and any other appropriate method for determining the moving speed and direction of the crowd in the cell based on the moving speeds and directions of pixels in the cell may be used. For example, the moving speed and the moving direction of each pixel may be regarded as a speed vector, vector addition may be performed for the speed vectors of all pixels in the cell, and a final vector sum may be obtained as the whole moving speed of the cell; thus the whole moving speed and direction of the cell can be obtained.

Referring back to FIG. 1, in step S150, orientation of the crowd in each of the cells is determined.

In this step, the orientation of the crowd in the cell is determined by the following steps: (S1) detecting persons in the cell; (S2) determining orientation of each of the detected persons; and (S3) determining the orientation of the crowd in the cell, based on the orientation of each of the detected persons.

In the processing (S1), a conventional method such as a connected area analysis method may be used to separate or detect a person in the cell. Alternatively, a special detection method mentioned in the above article published in 2003, for which the author is Michael Harville and the title is "Stereo Person Tracking with Adaptive Plan-View Templates of Height and Occupancy Statistics", may be used to detect a person in the cell. It should be noted that, the detection of the person described here is just rough detection for detecting an object that looks like a person in the cell, rather than accurate detection.

In the processing (S2), for each of the persons detected from the cell of the height-top-view in the processing (S1), a corresponding person is determined from the grayscale image corresponding to the height-top-view, and human face recognition is performed for the corresponding person in the grayscale image, using conventional human face recognition detectors such as a front-side detector, a left-side detector and a right-side detector, so as to determine the orientation of the person. In this way, at most 4 kinds of orientations can be obtained.

Optionally, in this processing, the classifier of 4 directions, e.g., 0°, 45°, 90° and 135° may also be trained using a "Plan-View Eigenposes" feature, and the detected orientations of the person may be determined using the 4-direction classifier obtained by the training. The orientation detection method may specifically refer to the article published in 2004, for which the author is Michael Harville and the title is "Fast, Integrated Person Tracking and Activity Recognition with Plan-View Templates from a Single Stereo Camera", the entire contents of which are hereby incorporated by reference.

In the processing (S3), a main orientation in the orientations of the K pixels in the cell may be calculated as a whole orientation of the cell. For example, statistics of the orientations of the K pixels in the cell may be taken, and the orientation with the most appearing times may be set as the whole orientation φ of the cell. Alternatively, the orientation of each pixel may be regarded as a vector whose width value is 1, vector addition may be performed for the vectors of all pixels in the cell, and a final vector sum may be obtained as a vector of the whole moving orientation of the cell; thus the whole moving orientation of the cell can be obtained.

In step S160, the interest degree of the crowd in each of the cells in the target position is determined, based on the density, the moving speed, the moving direction and the orientation of the crowd. In the following, the processing will be described with reference to FIG. 6.

Figure 6:
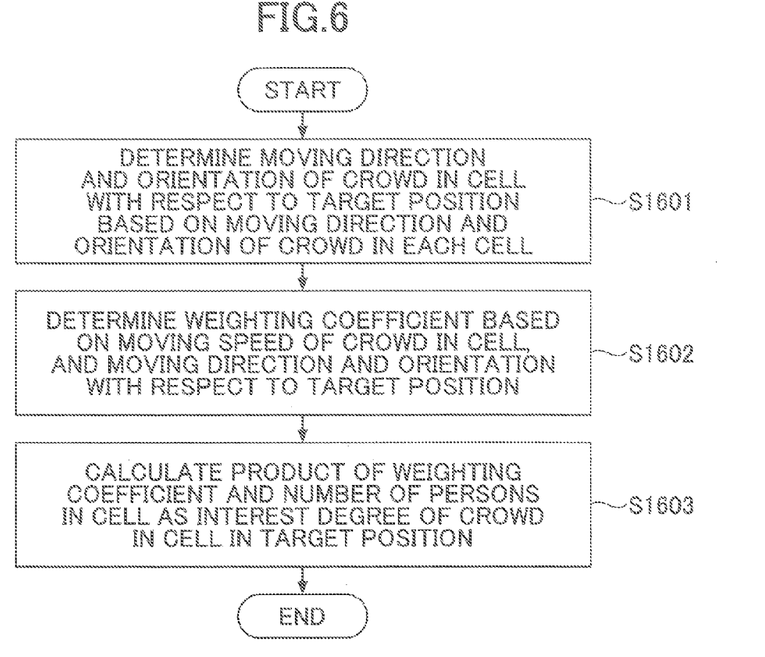
FIG. 6 is a flowchart illustrating a process of determining the interest degree based on the density, the moving speed, the moving direction and the orientation of the crowd in the method for detecting the interest degree of the crowd in the target position according to the embodiment.

As shown in FIG. 6, in step S1601, the moving direction and the orientation of the crowd in the cell with respect to the target position are determined, based on the moving direction and the orientation of the crowd in each cell.

The calculated moving direction θ and orientation φ of the crowd in the cell as described above are respectively moving direction and orientation with respect to the 0 degrees axis in the image coordinate system of the height-top-view. In this step, the moving direction $\theta_I$ and orientation $\varphi_I$ of the crowd in the cell with respect to the target position are obtained by conversion as shown in the following expression (7).

$$\varphi_I = \text{abs}\left(\tan^{-1}\left(\frac{v - V_I}{u - U_I}\right) - \varphi\right) \quad (7)$$

$$\theta_I = \text{abs}\left(\tan^{-1}\left(\frac{v - V_I}{u - U_I}\right) - \theta\right)$$

Here, $(U_I, V_I)$ are coordinates of the target position in the height-top-view, and (u,v) are coordinates of the cell in the height-top-view (for example, coordinates of the position of the center pixel of the cell may be set as position coordinates of the cell).

In step S1602, a weighting coefficient is determined, based on the moving speed of the crowd in the cell, and the moving direction and the orientation of the crowd in the cell with respect to the target position; so that the closer the crowd in the cell moves to the target position the greater the weighting coefficient is when the moving speed is greater than a predetermined speed threshold, and the more the crowd in the cell faces the target position the greater the weighting coefficient is when moving speed is less than or equal to the speed threshold.

In this step, the weighting coefficient may be determined by any appropriate method according to specific situations. As an example, the weighting coefficient may be determined as shown in expressions (8) and (9).

$$f(\rho, \varphi_I, \theta_I) = f1(\phi) \quad (8)$$

$$f1(\phi) = \begin{cases} 1, & |\phi| \leq 45° \\ \sqrt{2}\cos(\phi), & 45° < |\phi| \leq 90° \\ 0, & \text{else} \end{cases}$$

$$\phi = \begin{cases} \theta_I, \rho > speedThreshold \\ \theta_I, \rho \leq speedThreshold \end{cases} \quad (9)$$

Here, ρ represents the moving speed of the crowd in the cell, $f(\rho, \varphi_I, \theta_I)$ represents the weighting coefficient determined based on the moving speed ρ of the crowd in the cell, and the moving direction $\theta_I$ and the orientation $\varphi_I$ of the crowd with respect to the target position, speedThreshold is a predetermined speed threshold, and the speed threshold may be set based on the crowd density in the cell and experience values. According to the expression (9), when the moving speed is greater than the predetermined speed threshold speedThreshold, the weighting coefficient $f(\rho, \varphi_I, \theta_I)$ is determined based on the moving direction of the crowd with respect to the target position; and when the moving speed is not greater than the predetermined speed threshold speedThreshold, the weighting coefficient $f(\rho, \varphi_I, \theta_I)$ is determined based on the orientation of the crowd with respect to the target position. The expression (8) describes a specific method for determining the weighting coefficient based on the moving direction/orientation of the crowd with respect to the target position. It should be noted that, the expression (8) is just an example of the determination method; and any other appropriate method for determining the weighting coefficient may also be used, as long as the closer the crowd in the cell moves to the target position/the more the crowd in the cell faces the target position, the greater the weighting coefficient is.

In step S1603, the product of the weighting coefficient and number of persons in the cell is calculated as the interest degree of the crowd in the cell in the target position.

In this step, the product of the weighting coefficient and the crowd density in the cell may be calculated as the interest degree of the crowd in the target position as shown in expression (10).

$$I_t(u,v) = D \cdot f(\rho, \varphi_I, \theta_I) \quad (10)$$

Here, $I_t(u,v)$ represents the interest degree of the cell, whose coordinates are (u,v), in the target position, and D represents the crowd density in the cell. According to the expression (10), the interest degree of the crowd in the target position depends on not only the crowd density but also the moving speed, moving direction and orientation of the crowd with respect to the target position.

Figure 7:
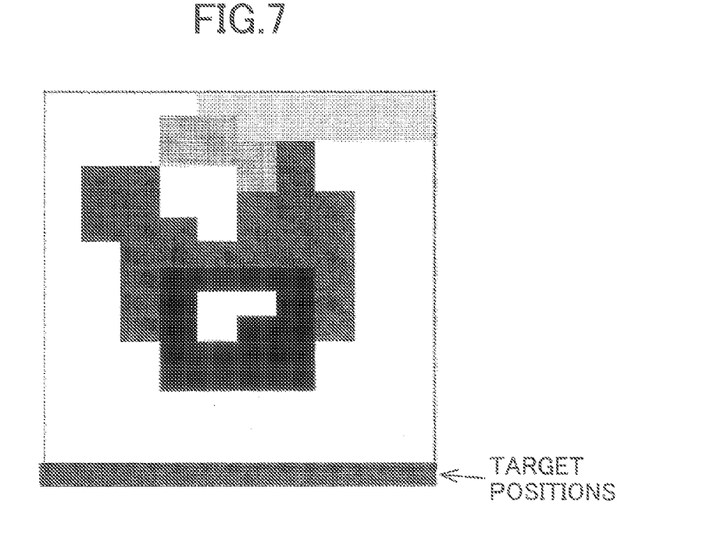
FIG. 7 is a distribution map of the detected interest degrees of the crowd in the target position according to the embodiment.

In this way, the interest degree of the crowd in the cell of the height-top-view with respect to the target position can be calculated. As described above, each cell in the height-top-view corresponds to a unit region on the ground in the real world; thus, in fact, the interest degree of the crowd in each unit region on the ground in the real world with respect to the target position is calculated. FIG. 7 is a distribution map of the detected interest degrees of the crowd in the target position according to the embodiment, where the darker the color of a position is, the higher the interest degree of the crowd at the position with respect to the target position is.

On the other hand, as described above, the interest degree of the crowd in each unit region with respect to the target position at a certain time is calculated. Alternatively, an accumulative interest degree of the crowd in each unit region with respect to the target region within a period, such as one hour, half a day, one day or the like, may also be calculated as shown in expression (11).

$$I = k \times \sum_t I_t \quad (11)$$

Here, I is the accumulative interest degree, $I_t$ is the interest degree at time t, and k is a normalization factor which is correlated with a frame rate of the photographed video or a frame rate processed by a system, such as k=1/fps.

According to the method for detecting the interest degree of the crowd in the target position according to embodiments, the interest degree of the crowd in the target position is comprehensively determined based on the crowd density, the crowd motion and the crowd orientation; thus the detection result is more objective and accurate than that of a method for detecting an interest degree of a crowd in a target position based on only the crowd density. Furthermore, according to the method for detecting the interest degree of the crowd in the target position according to the present invention, the interest degree is detected by detecting a crowd as a whole, but not by tracking and detecting each individual; thus, a good detection result can be obtained, even at a crowded place where it is difficult to track an individual. Additionally, in the method for detecting the interest degree of the crowd in the target position, a density detection feature, which indicates distribution of differences in height between pixels in the height-top-view, is used to detect the crowd density; thus, a human body can be detected accurately and the accuracy of the crowd density detection can be improved, since a human body proportion is considered in the density detection feature based on the height and accordingly this feature can represent a human body well.

It should be noted that, as an example, the method for detecting the crowd density, the crowd motion and the crowd orientation based on the height-top-view and further determining the interest degree of the crowd in the target position has been described above; however, this method may also use any other top views. For example, the interest degree of the crowd in the target position may also be determined based on an area-top-view; the method in this case is the same as the method for detecting the interest degree of the crowd in the target position based on a height-top-view, as long as the density detection feature indicating distribution of differences in height between pixels in the height-top-view is replaced by a density detection feature that is suitable for the area-top-view.

In addition, as an example of the density detection feature, the LBP feature has been described above; however, in fact, the LBP feature may also be replaced by any other appropriate image features such as a gradient feature, a Harris feature, a Haar feature or the like.

Furthermore, a method for detecting crowd density is further provided. The method includes projecting a depth image obtained by photographing onto a height-top-view, the depth image including a crowd; dividing the height-top-view into cells with a predetermined size; for each cell, extracting a density detection feature indicating distribution of differences in height between pixels in the cell; and detecting, based on the density detection feature, using a density model previously constructed by a statistical learning method, number of persons in each of the cells.

In an embodiment, the density detection feature is a Local binary pattern (LBP) feature based on a height. Extracting the density detection feature for each cell includes for each pixel in the cell, determining adjacent pixels around the pixel as a center, whose distance from the pixel is a predetermined distance; comparing a pixel value of the pixel and a pixel value of each adjacent pixel; if a difference between the pixel value of the adjacent pixel and the pixel value of the pixel is less than a first threshold and the pixel value of the adjacent pixel is greater than a second threshold, then allocating 1 to a value of the adjacent pixel, otherwise allocating 0 to the value of the adjacent pixel; and setting a binary code composed of the values of the adjacent pixels as a LBP code of the pixel. The first threshold and the second threshold are set based on a human body proportion.

In an embodiment, setting the binary code composed of the values of the adjacent pixels as the LBP code of the pixel includes performing rotation-invariant processing for the binary code composed of the sequentially arranged values of the adjacent pixels, and setting the binary code after the rotation-invariant processing as the LBP code of the pixel.

In an embodiment, detecting the number of the persons in each of the cells using the density model previously constructed by the statistical learning method based on the density detection feature includes for each cell, classifying the LBP codes of the pixels in the cell so that the same LBP codes are classified into the same category, and determining the number of the LBP codes included in each category; and calculating, based on the categories of the classified LBP codes and the number of the LBP codes included in each category, using the density model, the number of the persons in each cell. The density model is obtained by performing training by the statistical learning method, in which the categories of the LBP codes and the number of the LBP codes included in each category serve as independent variables and the actual number of persons in cells corresponding to values of the independent variables serves as dependent variables, and the actual number of the persons is obtained by statistical processing in advance.

Specific processing of the above steps in the method for detecting the crowd density may refer to corresponding description of FIGS. 1 to 4C, and the description thereof is omitted here. In this method, a density detection feature, which indicates distribution of differences in height between pixels in the height-top-view, is used to detect the crowd density; thus, a human body can be detected accurately and the accuracy of the crowd density detection can be improved, since a human body proportion is considered in the density detection feature based on the height and accordingly this feature can represent a human body well.

In the following, an apparatus for detecting an interest degree of a crowd in a target position according to an embodiment will be described with reference to FIG. 8.

Figure 8:
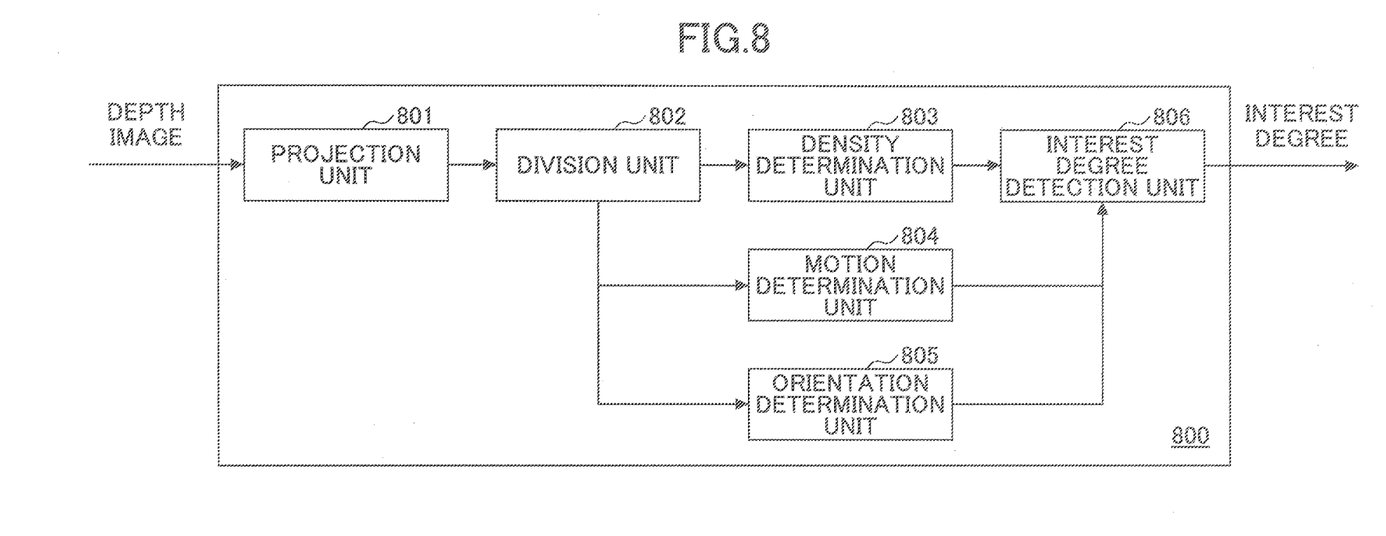
FIG. 8 is a block diagram illustrating a functional configuration of an apparatus for detecting an interest degree of a crowd in a target position according to an embodiment.

FIG. 8 is a block diagram illustrating a functional configuration of the apparatus for detecting the interest degree of the crowd in the target position according to the embodiment.

As shown in FIG. 8, an object apparatus 800 may include: a projection unit 801 configured to project a depth image obtained by photographing onto a height-top-view, the depth image including the crowd and the target position; a division unit 802 configured to divide the height-top-view into cells with a predetermined size; a density determination unit 803 configured to determine density of the crowd in each of the cells; a motion determination unit 804 configured to determine a moving speed and a moving direction of the crowd in each of the cells; an orientation determination unit 805 configured to determine orientation of the crowd in each of the cells; and an interest degree detection unit 806 configured to determine, based on the density, the moving speed, the moving direction and the orientation of the crowd, the interest degree of the crowd in each of the cells in the target position.

Alternatively, the density determination unit 803 may further include: an extraction unit configured to extract, from each cell, a density detection feature indicating distribution of differences in height between pixels in the cell; and a density detection unit configured to detect, based on the density detection feature, using a density model previously constructed by a statistical learning method, the number of persons in the cell.

Alternatively, the motion determination unit 804 may further include: a pixel motion determination unit configured to calculate, based on the depth image and a grayscale image or a color image corresponding to the depth image, the moving speed and the moving direction of each pixel in each cell; and an overall motion determination unit configured to determine, based on the moving speed and the moving direction of each pixel in the cell, the moving speed and the moving direction of the crowd in the cell.

Alternatively, the orientation determination unit 805 may further include: an individual detection unit configured to detect persons in the cell; an individual orientation determination unit configured to determine orientation of each of the detected persons; and an overall orientation determination unit configured to determine, based on the orientation of each of the detected persons, the orientation of the crowd in the cell.

Alternatively, the interest degree detection unit 806 may further include: a conversion unit configured to determine, based on the moving direction and the orientation of the crowd in each cell, the moving direction and the orientation of the crowd in the cell with respect to the target position; a weighting coefficient determination unit configured to determine, based on the moving speed of the crowd in the cell, and the moving direction and the orientation of the crowd in the cell with respect to the target position, a weighting coefficient, so that the closer the crowd in the cell moves to the target position the greater the weighting coefficient is when the moving speed is greater than a predetermined speed threshold, and the more the crowd in the cell faces the target position the greater the weighting coefficient is when moving speed is less than or equal to the speed threshold; and a weighting unit configured to calculate the product of the weighting coefficient and number of persons in the cell as the interest degree of the crowd in the cell in the target position.

Specific functions and operations of the projection unit 801, the division unit 802, the density determination unit 803, the motion determination unit 804, the orientation determination unit 805, the interest degree detection unit 806, the extraction unit, the density detection unit, the pixel motion determination unit, the overall motion determination unit, the individual detection unit, the individual orientation determination unit, the overall orientation determination unit, the conversion unit, the weighting coefficient determination unit and the weighting unit described above may refer to the description relating to FIGS. 1 to 7, and the description thereof is omitted here.

Figure 9:
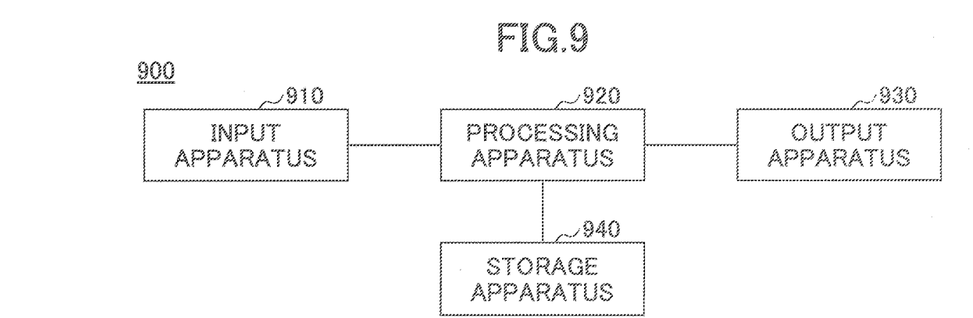
FIG. 9 is a schematic drawing illustrating the overall hardware configuration of a system for detecting an interest degree of a crowd in a target position according to an embodiment.

FIG. 9 is a schematic drawing illustrating the overall hardware configuration of a system 900 for detecting an interest degree of a crowd in a target position according to an embodiment.

As shown in FIG. 9, the system 900 for detecting the interest degree of the crowd in the target position may include: an input apparatus 910 for inputting images or information from the outside, such as a depth image photographed by a camera, a grayscale image (a color image) or the like, for example, which may include a keyboard, a mouse, a camera, etc.; a processing apparatus 920 for implementing the above method for detecting an interest degree of a crowd in a target position according to the embodiment or the above apparatus for detecting an interest degree of a crowd in a target position according to the embodiment, which may include the CPU of a computer or other chips having processing ability, etc.; an output apparatus 930 for outputting a result of the above detection, such as interest degrees of regions in a target position which are adjacent to the target position in the real world, which may include a screen, a printer, etc.; and a storage apparatus 940 for storing depth images, grayscale images (color images), thresholds, values of the density detection features, density models, crowd density in cells, moving speeds and moving directions of crowds in cells, orientations of crowds in cells, etc., by a volatile method or a nonvolatile method, which may include various kinds of volatile or nonvolatile memory including a random-access memory (RAM), a read-only memory (ROM), a hard disk and a semiconductor memory.

The basic principle is described with reference to the above specific embodiments. It should be noted that, the advantage or effect described above is just an example, and the embodiments are not limited to the advantage or effect. The above descriptions of the embodiments are just examples, and various modifications, replacements or combinations may be made without departing from the scope of the present invention by persons skilled in the art.

The block diagrams of the units, apparatuses, devices and system are just examples, the connection, placement and configuration illustrated in the block diagrams related to the present invention are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not. The term "such as" means and may be changed to "such as, but not limited to".

The flowchart and the method according to the present invention are just examples, and not limited to the steps in the embodiments. The steps of the embodiments may be performed in any order. The terms "next", "subsequently" and "then" are just for describing the present invention, and the present invention is not limited to these terms. Furthermore, the articles "a", "an" and "the" should not be limited to the singular element.

Furthermore, the term "or" before the term "at least one" means a separate enumerating, and for example, "at least one of A, B or C" means (1) A, B or C, (2) AB, AC or BC, or (3) ABC (namely, A and B and C). Additionally, the term "example" does not mean a preferable example or an example superior to other examples.

It should be noted that, in the apparatus and method of the embodiments, each unit or each step may be divided and/or recombined. The division and/or recombination may be equivalents of the embodiments.

The present specification and the appended claims includes other examples and implementations. For example, the above functions may be implemented by a processor, hardware, software, firmware, hard-wire or any combination thereof. The features for implementing the functions may be located at any physical position where which is distributed to each position physically. The present invention may use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments. The general-purpose processor is a micro-processor, and alternatively, the processor may be any processors, controllers, micro-controllers or state machines that can be obtained commercially. The processor may also be the combination of the computer equipment, such as the combination of a DSP and a micro-processor, the combination of plural micro-processors, or the combination of a DSP and plural micro-processors. When the function is implemented by software, the function may be stored in a computer-readable medium as one or more commands. The recording medium may be any real medium that can be accessed by a computer. Such a computer-readable medium includes a RAM, a ROM, an EEPROM, a CD-ROM or other laser discs, a magnetic disk or other magnetic memory, or any other real media that carry or store commands, data or program codes and are accessed by the computer. Such disk and disc include a CD, a laser disc, an optical disc, a DVD disc, a floppy disk and a blue-ray disc, and the disk usually reproduces data and the disc reproduces data by a laser.

The operations may be performed by a computer program product. For example, such computer program product may be a tangible medium where computer-readable commands are stored (or coded), and the commands may be executed by one or more processors to perform the operation. The computer program product may include packaging material.

Various modifications, replacements or combinations may be made without departing from the scope of the present invention by persons skilled in the art. Furthermore, the scope of the present specification and the claims are not limited to the above processing, machine, manufacture, composition of events, means, method and operation. The processing, machine, manufacture, composition of events, means, method and operation with a similar function or a similar result may also be applied to the present invention. Therefore, the scope of the appended claims include such processing, machine, manufacture, composition of events, means, method and operation.

The method or apparatus of the present invention are described above. The above descriptions of the embodiments are just examples, and various modifications, replacements or combinations may be made without departing from the scope of the present invention by persons skilled in the art.

The present application is based on and claims the benefit of priority of Chinese Priority Application No. 201410645077.4 filed on Nov. 12, 2014, the entire contents of which are hereby incorporated by reference.

What is claimed is:

1. A method for detecting crowd density, the method comprising:
projecting a depth image obtained by photographing onto a height-top-view, the depth image including a crowd;
dividing the height-top-view into cells with a predetermined size;
for each respective cell of the cells, extracting a density detection feature indicating distribution of differences in height between pixels in the cell; and
detecting, based on the density detection feature, using a density model previously constructed by a statistical learning method, number of persons in each of the cells,
wherein the density detection feature is a Local binary pattern (LBP) feature based on a height, and
wherein the extracting of the density detection feature for each respective cell, and for each respective pixel in the cell, includes
determining adjacent pixels around the respective pixel as a center, whose distance from the respective pixel is a predetermined distance,
comparing a pixel value of the respective pixel and a pixel value of each of the respective adjacent pixels and if a difference between the pixel value of a respective one of the adjacent pixels and the pixel value of the respective pixel is less than a first threshold and the pixel value of the respective one of the adjacent pixels is greater than a second threshold, then allocating 1 to a value of the respective one of the adjacent pixels, and if not, then allocating 0 to the value of the respective one of the adjacent pixels, and
setting a binary code composed of the values of the adjacent pixels as a LBP code of the pixel.

2. The method for detecting crowd density according to claim 1,
wherein the setting of the binary code composed of the values of the adjacent pixels as the LBP code of the pixel includes
performing rotation-invariant processing for the binary code composed of the sequentially arranged values of the adjacent pixels, and setting the binary code after the rotation-invariant processing as the LBP code of the pixel.

3. The method for detecting crowd density according to claim 2,
wherein the detecting of the number of the persons in each of the cells using the density model previously constructed by the statistical learning method based on the density detection feature includes
for each cell, classifying the LBP codes of the pixels in the cell so that the same LBP codes are classified into the same category, and determining number of the LBP codes included in each category; and
calculating, based on the categories of the classified LBP codes and the number of the LBP codes included in each category, using the density model, the number of the persons in each cell,
wherein the density model is obtained by performing training by the statistical learning method, in which the categories of the LBP codes and the number of the LBP codes included in each category serve as independent variables and actual number of persons in cells corresponding to values of the independent variables serves as dependent variables, and the actual number of the persons is obtained by statistical processing in advance.

4. The method for detecting crowd density according to claim 1,
wherein the first threshold and the second threshold are set based on a human body proportion.

5. A method for detecting an interest degree of a crowd in a target position, the method comprising:
projecting a depth image obtained by photographing onto a height-top-view, the depth image including the crowd and the target position;
dividing the height-top-view into cells with a predetermined size;
determining density of the crowd in each of the cells;
determining a moving speed and a moving direction of the crowd in each of the cells;

determining orientation of the crowd in each of the cells; and determining, based on the density, the moving speed, the moving direction and the orientation of the crowd, the interest degree of the crowd in each of the cells in the target position, wherein the determining of the density of the crowd in each of the cells includes extracting, from each of the respective cells, a density detection feature indicating distribution of differences in height between pixels in the respective cell, and detecting, based on the density detection feature, using a density model previously constructed by a statistical learning method, a number of persons in the cell, wherein the density detection feature is a Local binary pattern (LBP) feature based on a height, and wherein the extracting of the density detection feature from each respective cell, and for each respective pixel in the cell, includes determining adjacent pixels around the respective pixel as a center, whose distance from the respective pixel is a predetermined distance, comparing a pixel value of the respective pixel and a pixel value of each of the respective adjacent pixels and if a difference between the pixel value of a respective one of the adjacent pixels and the pixel value of the respective pixel is less than a first threshold and the pixel value of the respective one of the adjacent pixels is greater than a second threshold, then allocating 1 to a value of the respective one of the adjacent pixels, and if not, then allocating 0 to the value of the respective one of the adjacent pixels, and setting a binary code composed of the values of the adjacent pixels as a LBP code of the pixel.

6. The method for detecting an interest degree of a crowd in a target position according to claim 5, wherein the setting of the binary code composed of the values of the adjacent pixels as the LBP code of the pixel includes performing rotation-invariant processing for the binary code composed of the sequentially arranged values of the adjacent pixels, and setting the binary code after the rotation-invariant processing as the LBP code of the pixel.

7. The method for detecting an interest degree of a crowd in a target position according to claim 5, wherein the detecting of the number of the persons in each of the cells using the density model previously constructed by the statistical learning method based on the density detection feature includes for each cell, classifying the LBP codes of the pixels in the cell so that the same LBP codes are classified into the same category, and determining number of the LBP codes included in each category; and calculating, based on the categories of the classified LBP codes and the number of the LBP codes included in each category, using the density model, the number of the persons in each cell, wherein the density model is obtained by performing training by the statistical learning method, in which the categories of the LBP codes and the number of the LBP codes included in each category serve as independent variables and actual number of persons in cells corresponding to values of the independent variables serves as dependent variables, and the actual number of the persons is obtained by statistical processing in advance.

8. The method for detecting an interest degree of a crowd in a target position according to claim 5, wherein the first threshold and the second threshold are set based on a human body proportion.

9. The method for detecting an interest degree of a crowd in a target position according to claim 5, wherein the determining of the moving speed and the moving direction of the crowd in each of the cells includes calculating, based on the depth image and a grayscale image or a color image corresponding to the depth image, the moving speed and the moving direction of each pixel in each cell; and determining, based on the moving speed and the moving direction of each pixel in the cell, the moving speed and the moving direction of the crowd in the cell.

10. The method for detecting an interest degree of a crowd in a target position according to claim 5, wherein the determining of the orientation of the crowd in each of the cells includes detecting persons in the cell;

determining orientation of each of the detected person; and determining, based on the orientation of each of the detected persons, the orientation of the crowd in the cell.

11. The method for detecting an interest degree of a crowd in a target position according to claim 5, wherein the determining of the interest degree of the crowd in each of the cells in the target position includes determining, based on the moving direction and the orientation of the crowd in each cell, the moving direction and the orientation of the crowd in the cell with respect to the target position;

determining, based on the moving speed of the crowd in the cell, and the moving direction and the orientation of the crowd in the cell with respect to the target position, a weighting coefficient, so that the closer the crowd in the cell moves to the target position the greater the weighting coefficient is when the moving speed is greater than a predetermined speed threshold, and the more the crowd in the cell faces the target position the greater the weighting coefficient is when moving speed is less than or equal to the speed threshold; and calculating the product of the weighting coefficient and number of persons in the cell as the interest degree of the crowd in the cell in the target position.

12. An apparatus for detecting an interest degree of a crowd in a target position, the apparatus comprising:

a projection unit configured to project a depth image obtained by photographing onto a height-top-view, the depth image including the crowd and the target position;

a division unit configured to divide the height-top-view into cells with a predetermined size;

a density determination unit configured to determine density of the crowd in each respective cell of the cells;

a motion determination unit configured to determine a moving speed and a moving direction of the crowd in each of the respective cells;

an orientation determination unit configured to determine orientation of the crowd in each of the respective cells; and an interest degree detection unit configured to determine, based on the density, the moving speed, the moving direction and the orientation of the crowd, the interest degree of the crowd in each of the respective cells in the target position, wherein the density determination unit is configured to determine the density of the crowd in each respective cell, by further being configured to extract, from each of the respective cells, a density detection feature indicating distribution of differences in height between pixels in the respective cell, and detect, based on the density detection feature, using a density model previously constructed by a statistical learning method, a number of persons in the cell, wherein the density detection feature is a Local binary pattern (LBP) feature based on a height, and wherein the density determination unit is configured to extract the density detection feature for each respective cell, and for each respective pixel in the cell, by further being configured to determine adjacent pixels around the respective pixel as a center, whose distance from the respective pixel is a predetermined distance, compare a pixel value of the respective pixel and a pixel value of each of the respective adjacent pixels and if a difference between the pixel value of a respective one of the adjacent pixels and the pixel value of the respective pixel is less than a first threshold and the pixel value of the respective one of the adjacent pixels is greater than a second threshold, then allocating 1 to a value of the respective one of the adjacent pixels, and if not, then allocating 0 to the value of the respective one of the adjacent pixels, and set a binary code composed of the values of the adjacent pixels as a LBP code of the pixel.

* * * * *